UNITED STATES PATENT OFFICE.

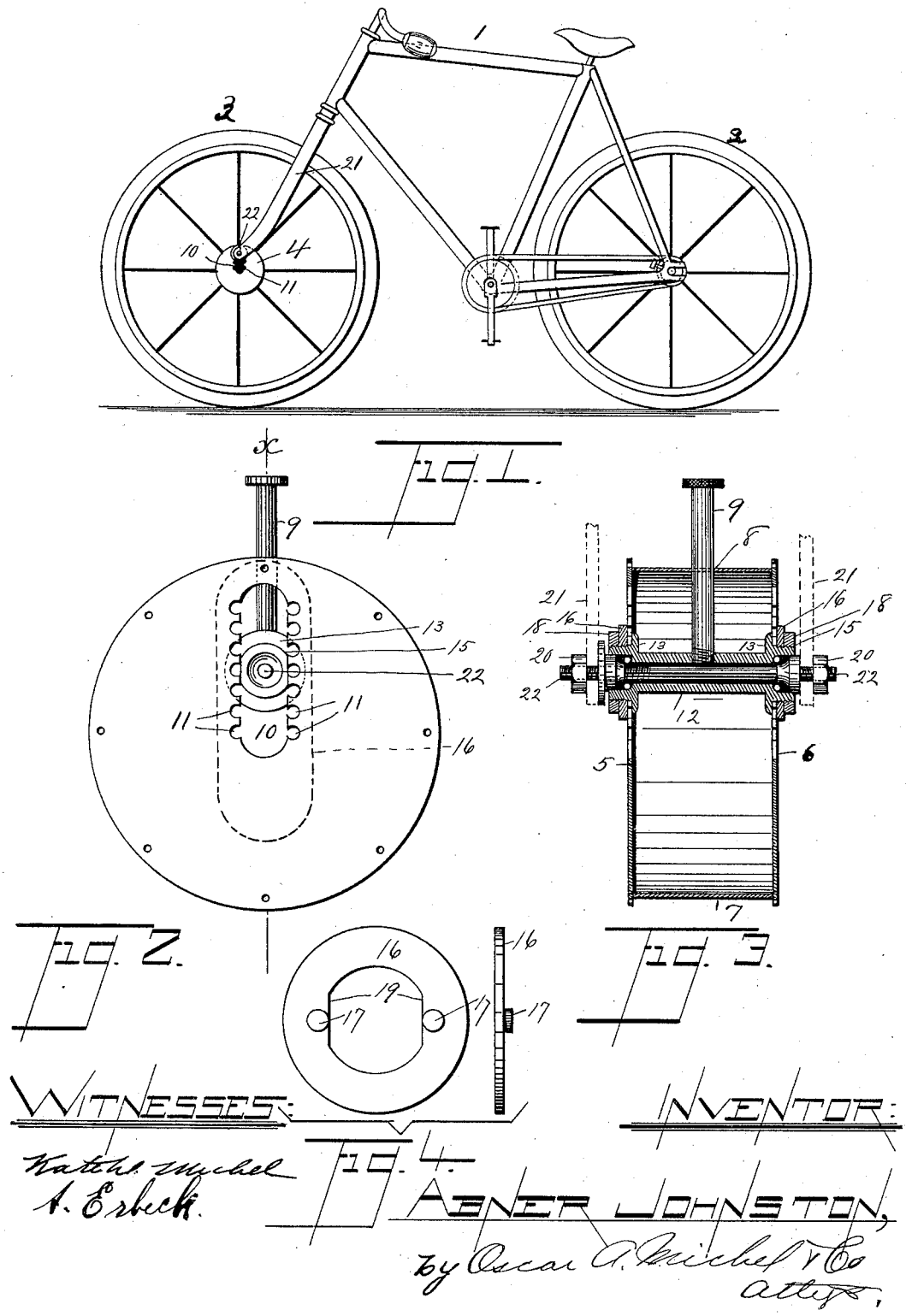

ABNER JOHNSTON, OF JERSEY CITY, NEW JERSEY, ASSIGNOR OF FIVE-EIGHTHS TO GEORGE B. FIELDER, OF SAME PLACE, AND R. GUY FOSTER, OF NEW YORK, N. Y.

BICYCLE.

SPECIFICATION forming part of Letters Patent No. 605,182, dated June 7, 1898.

Application filed April 8, 1897. Serial No. 631,309. (No model.)

*To all whom it may concern:*

Be it known that I, ABNER JOHNSTON, a citizen of the United States, residing at Jersey City, in the county of Hudson and State of New Jersey, have invented certain new and useful Improvements in Bicycles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to an improvement in bicycles, more especially to that class called "safety."

The objects of this invention are, first, to give the rider the motion similar to cantering; second, varied uses of muscles; third, greater number of muscles exercised, and, fourth, to teach horsemanship.

Referring to the accompanying drawings, in which like figures of reference indicate corresponding parts in each of the several views where they occur, Figure 1 is a side elevation of an ordinary safety-bicycle with my improvement secured to the front wheel. Fig. 2 is an enlarged view of the hub of the front wheel, showing my improvement with the outside nut and washer removed. Fig. 3 is a central vertical section on the line $x\,x$ of Fig. 2, showing in dotted outlines the front fork of the bicycle. Fig. 4 is a plan and side elevation of the washer, showing the lugs.

In said drawings, 1 represents the frame of an ordinary bicycle, having the rear and front wheels 2 and 3 secured thereto in the ordinary manner. The hub 4 of the front wheel 3 is composed of plates 5 and 6, secured together by a band 7, having an opening 8, through which the oiling device 9 passes, said plates 5 and 6 being provided with an elongated central opening 10, having on each side thereof smaller openings 11, as will be seen upon referring to the drawings. On the inner side of said plates 5 and 6 is placed the ordinary axle-bearing 12, having a flange 13, against which the plates 5 and 6 rest. Beyond the flange 13 is the ordinary screw-threaded hub 15, to which the washer 16, having the lugs 17, is secured. On the outer side of said washer 16 is secured a nut 18 to hold said washer and hub in place. This washer 16 by preference will be made oblong, so that the openings 10 and 11 will be covered at all times, so that no dirt or dust can collect in said drum. The opening through the center of said washer will have flat side 19 and not circular, so that when the same is inserted upon the screw-thread hub 15 it will not be liable to turn, but remain in one position, so that the lugs 17 will enter the opening in said plates, as will be clearly understood upon referring to the drawings. The lugs 17 on said washer 16 enter the corresponding openings 11 of the elongated opening 10 on the plates 5 and 6, so that when the nut 18 is screwed home weight can be brought to bear on the axle without displacing same. The axle, the ball-bearings, &c., are of the ordinary construction and need no description.

To operate my invention, I loosen the nuts 18 on the screw-threaded hub 15, and thus free the washer 16, so that the same may be drawn out of engagement of the openings 11, and the hub and axle can then be raised or lowered to that position desired by the rider.

It will be seen upon referring to the drawings that it is absolutely unnecessary to change or loosen the nuts 20 on the extreme end of the axle 22, which hold the fork 21 of the bicycle-frame 1 and the ball-bearings in place, thus preventing the trouble and annoyance of truing the wheel each time the change of position of axle is made.

I do not wish to be understood as limiting myself to the exact construction as shown, as various changes may be made without departing from the spirit of my invention.

What I claim as new, and desire to secure by Letters Patent of the United States, is—

1. In a bicycle, the front wheel having its hub provided with a slot which extends from the center, radially toward one edge thereof, combined with the front axle, which passes through the slot, and is adjustable therein, and means for rigidly securing the axle in any desired position in the slot, whereby the front end of the frame is given a rising-andfalling movement when the bicycle is in motion, substantially as shown.

2. In a bicycle, a hub of a wheel having slots made therein, and which slots have notches along their edges, combined with an axle-bearing which passes through the slots, and supporting devices for said bearing, provided with means for catching in the notches and supporting the axle-bearing in any desired position, whereby the position of the axle with relation to the center of the wheels is changed, substantially as described.

3. In a bicycle the combination of the frame, the hub of the front wheel composed of end plates having openings 10 and 11, an axle-bearing having flange 13 to rest against the inner side of said plates, and having a projection extending out of said plate to hold the washer 16 having lugs 17 which enter corresponding openings 11 in said plate, an axle passing through said axle-bearing, as and for purposes set forth.

4. In a bicycle the combination of the frame, the hub of the front wheel composed of plates 5 and 6 having an opening 10 through which the axle-bearing passes, a washer 16 having lugs 17 on the inner side to correspond with and enter the openings 11 on said plate, nuts to hold said washer and axle-bearing in place, an axle 22 passing through said axle-shell and secured to front fork of said frame, substantially as set forth.

In testimony that I claim the invention set forth above I have hereunto set my hand this 27th day of March, 1897.

ABNER JOHNSTON.

Witnesses:
OSCAR A. MICHEL,
NATE W. MICHEL.